(12) United States Patent
Battle et al.

(10) Patent No.: US 7,412,111 B2
(45) Date of Patent: Aug. 12, 2008

(54) ENHANCED IMAGE PROCESSING METHOD FOR THE PRESENTATION OF DIGITALLY-COMBINED MEDICAL IMAGES

(75) Inventors: Vianney Pierre Battle, Salt Lake City, UT (US); Renuka Uppaluri, Pewaukee, WI (US); Richard Warp, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 645 days.

(21) Appl. No.: 10/993,082

(22) Filed: Nov. 19, 2004

(65) Prior Publication Data

US 2006/0110064 A1    May 25, 2006

(51) Int. Cl.
*G06K 9/36* (2006.01)
*G06K 9/00* (2006.01)
*G06K 9/32* (2006.01)

(52) U.S. Cl. .................... 382/284; 382/128

(58) Field of Classification Search .............. 382/128, 382/132, 162, 164, 173, 254, 274, 284; 378/62, 378/98.12
See application file for complete search history.

(56) References Cited

U.S. PATENT DOCUMENTS

| 5,368,033 | A | * | 11/1994 | Moshfeghi .................. 600/419 |
| 6,215,849 | B1 |  | 4/2001 | Lienard et al. |
| 6,990,169 | B2 | * | 1/2006 | Claus et al. .................... 378/4 |
| 7,250,949 | B2 | * | 7/2007 | Claus et al. .................. 345/424 |
| 2005/0135557 | A1 | * | 6/2005 | Claus et al. .................. 378/21 |
| 2006/0110064 | A1 | * | 5/2006 | Battle et al. ................. 382/274 |

\* cited by examiner

*Primary Examiner*—Amir Alavi (57) ABSTRACT

The present invention provides a method and associated system for processing a digital medical image. The method includes defining a plurality regions of an initial digital medical image, wherein the initial digital medical image is a combined initial digital medical image formed from the digital pasting of a plurality of individual initial digital medical images, and wherein the initial digital medical image is an exposure-normalized initial digital medical image; measuring an intensity for each of the plurality of regions of the initial digital medical image; deriving an intensity weighting function using the intensity measured for each of the plurality of regions of the initial digital medical image; and applying the intensity weighting function to the initial digital medical image to form a final digital medical image.

13 Claims, 8 Drawing Sheets

ENHANCED IMAGE PROCESSING METHOD FOR THE PRESENTATION OF DIGITALLY-COMBINED MEDICAL IMAGES

FIELD OF THE INVENTION

The present invention relates generally to the medical imaging field. More specifically, the present invention relates to an enhanced image processing method for the presentation of digitally-combined medical images.

BACKGROUND OF THE INVENTION

With applications ranging from diagnostic procedures to radiation therapy, the importance of high-performance medical imaging is immeasurable. As a result, new high-performance medical imaging technologies are continually being developed. Digital medical imaging technologies represent the future of medical imaging. Digital medical imaging systems are capable of producing far more accurate and detailed images of an anatomical object than conventional, film-based medical imaging systems. Such digital medical imaging systems also allow for image enhancement once an anatomical object has been scanned, further enhancing their usefulness.

The flat-panel digital radiographic imaging detectors available today typically have a maximum imaging size of about 40 cm×40 cm. Often, an area of interest larger than 40 cm×40 cm must be imaged. In such cases, several sub-images are taken and combined to form a single, larger image of the area of interest. For example, if a 90 cm spinal image must be taken, three separate sub-images of the spine must be taken and combined to form a single, larger image. This presents a challenge because a wide range of anatomical thicknesses must be represented. Typically, a spinal image includes very thin anatomical parts, such as the c-spine, and very thick anatomical parts, such as the abdomen.

Figure 1:
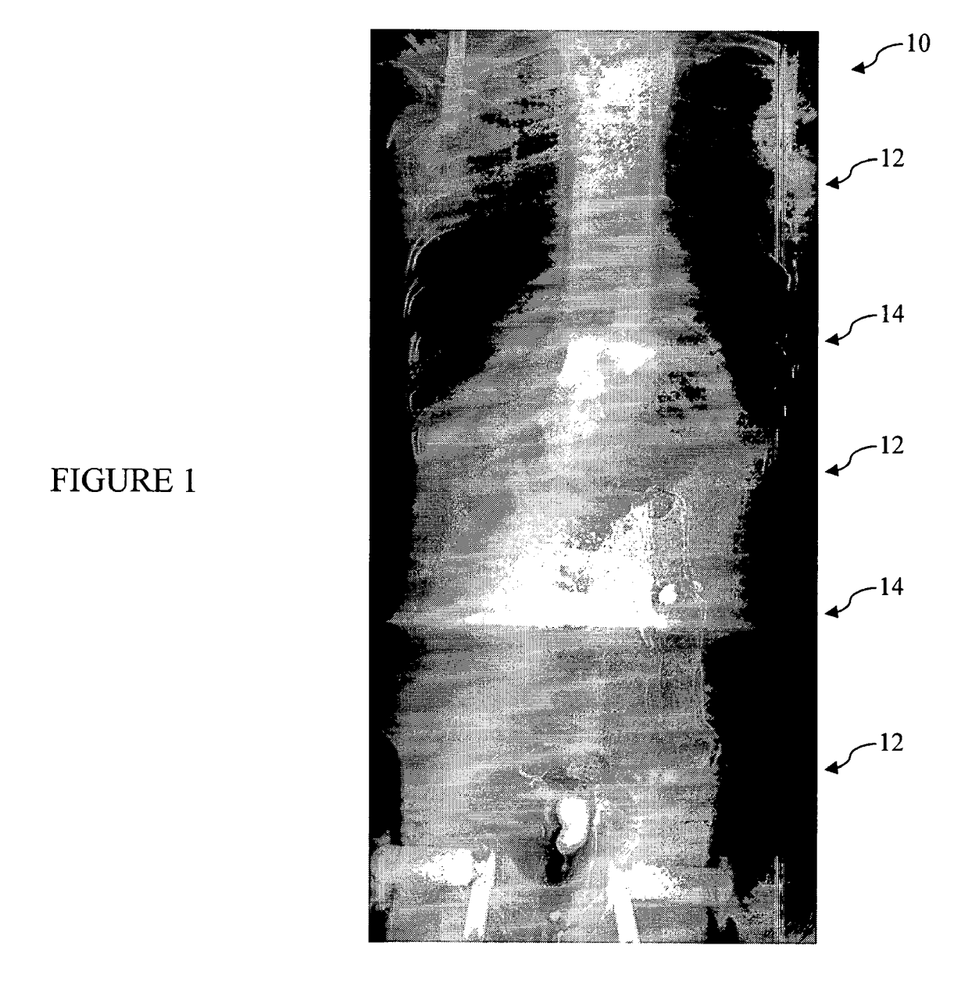
FIG. 1 is a digital medical image illustrating the shortcomings of conventional auto-exposure techniques for combining a plurality of sub-images into a single, larger combined image, the presence of low-frequency band artifacts obscuring portions of the combined image.
Figure 2:
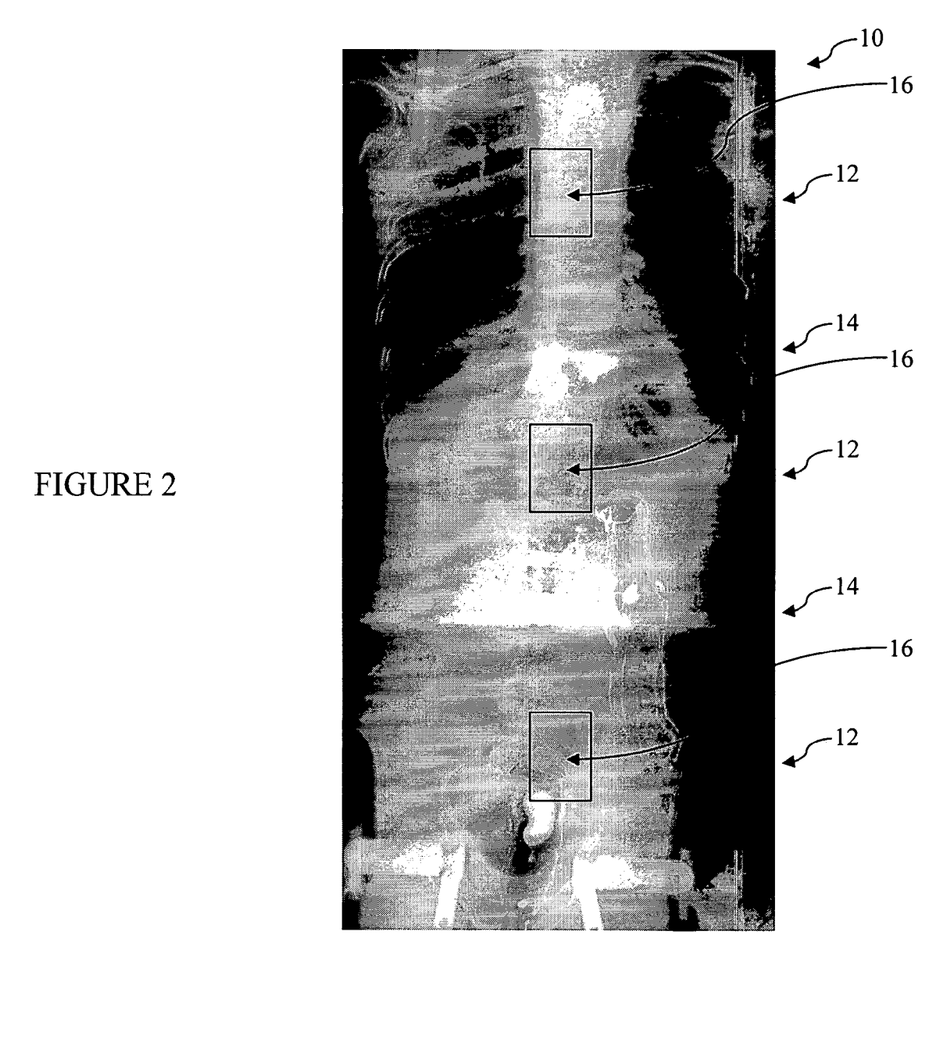
FIG. 2 is a digital medical image illustrating the locations of the ion chambers associated with each of the sub-images used in conjunction with the conventional auto-exposure techniques of FIG. 1, the locations of the ion chambers substantially corresponding to the locations where brightness or intensity levels are measured and matched for each of the sub-images to form the single, larger combined image.

When sub-images are acquired using auto-exposure techniques and processed individually, the auto-exposure techniques ensure that anatomical thickness differences are compensated for and accurately represented. The combined image will then have a sufficiently narrow dynamic range to be displayed as is. Referring to FIGS. 1 and 2, however, the combined image 10 will include different brightness or intensity bands, the boundaries of which correspond to the boundaries of the sub-images 12. These low-frequency band artifacts 14 are caused by the fact that the brightness or intensity levels of each of the sub-images 12 are matched only where they are measured, namely in the center portion 16 of each of the sub-images 12. The low-frequency band artifacts 14 are bothersome to those analyzing the combined image 10, especially in the junction regions, and may obscure anatomical detail.

Figure 3:
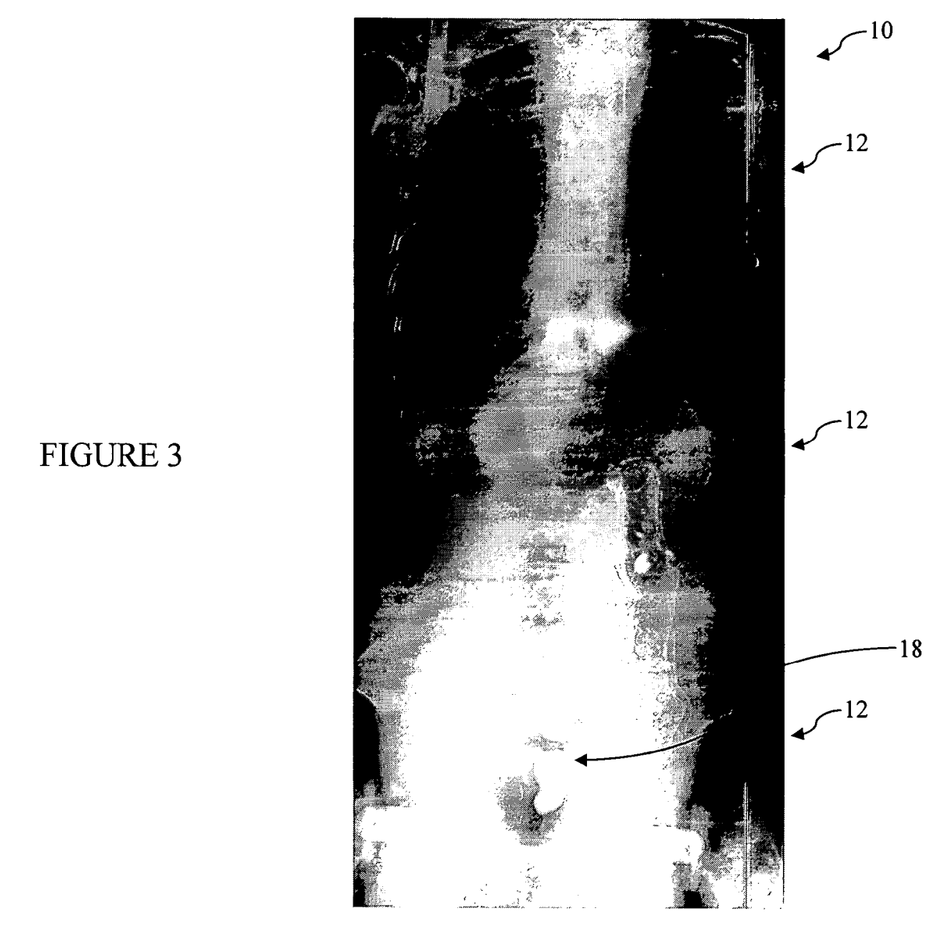
FIG. 3 is a digital medical image illustrating the shortcomings of conventional fixed and related techniques for combining a plurality of sub-images into a single, larger combined image, some portions of the combined image becoming saturated.

When sub-images are acquired using fixed techniques, or if the sub-images are normalized with regard to exposure, the different brightness or intensity bands are not visible. Referring to FIG. 3, however, the dynamic range of the combined image 10 is increased and some portions 18 of the combined image 10 become saturated. Conventional image-equalization algorithms may compensate for this effect, but extreme parameters must be used, leading to potentially strong distortions in the area of interest, as such algorithms are typically designed for the specific detector size.

Thus, what is needed is a pre-processing imaging method that compensates for dynamic range in the direction(s) of the combined scan, such that the desirable effects of the conventional image-equalization algorithms are preserved.

BRIEF SUMMARY OF THE INVENTION

Accordingly, the above-identified shortcomings of existing medical imaging systems and methods are overcome by the various embodiments of the present invention, which relate to enhanced image processing for the presentation of digitally-combined medical images.

In one specific embodiment of the present invention, a method for processing a digital image includes defining a plurality regions of an initial digital image; measuring an intensity for each of the plurality of regions of the initial digital image; deriving an intensity weighting function using the intensity measured for each of the plurality of regions of the initial digital image; and applying the intensity weighting function to the initial digital image to form a final digital image.

In another specific embodiment of the present invention, a method for processing a digital medical image includes defining a plurality regions of an initial digital medical image, wherein the initial digital medical image is a combined initial digital medical image formed from the digital pasting of a plurality of individual initial digital medical images, and wherein the initial digital medical image is an exposure-normalized initial digital medical image; measuring an intensity for each of the plurality of regions of the initial digital medical image; deriving an intensity weighting function using the intensity measured for each of the plurality of regions of the initial digital medical image; and applying the intensity weighting function to the initial digital medical, image to form a final digital medical image.

In a further specific embodiment of the present invention, a system for processing a digital image includes a first algorithm for defining a plurality regions of an initial digital image; a second algorithm for measuring an intensity for each of the plurality of regions of the initial digital image; a third algorithm for deriving an intensity weighting function using the intensity measured for each of the plurality of regions of the initial digital image; and a fourth algorithm for applying the intensity weighting function to the initial digital image to form a final digital image.

Further features, aspects, and advantages of the present invention will become more readily apparent to those of ordinary skill in the art during the course of the following detailed description of the invention, wherein references are made to the accompanying drawings which illustrate some preferred embodiments of the present invention, and wherein like characters of reference designate like parts throughout the drawings.

BRIEF DESCRIPTION OF THE DRAWINGS

The systems and methods of the present invention are described herein below with reference to the accompanying drawings, in which.

DETAILED DESCRIPTION OF THE INVENTION

For the purposes of promoting an understanding of the present invention, reference will now be made to some preferred embodiments of the present invention, as illustrated in FIGS. 1-8, and specific language use to describe the same. The terminology used herein is for the purpose of description, and not limitation. The specific structural and functional details disclosed herein are not to be interpreted as limiting, but merely as a basis for the claims and for teaching one of ordinary skill in the art to variously employ the systems and methods of the present invention. Any modifications to or variations in the depicted systems and methods and such further applications of the principles of the present invention as would normally occur to one of ordinary skill in the art are considered to be within the spirit and scope of the present invention.

As described above, the flat-panel digital radiographic imaging detectors available today typically have a maximum imaging size of about 40 cm×40 cm. Often, an area of interest larger than 40 cm×40 cm must be imaged. In such cases, several sub-images are taken and combined to form a single, larger image of the area of interest. For example, if a 90 cm spinal image must be taken, three separate sub-images of the spine must be taken and combined to form a single, larger image. This presents a challenge because a wide range of anatomical thicknesses must be represented. Typically, a spinal image includes very thin anatomical parts, such as the c-spine, and very thick anatomical parts, such as the abdomen.

Figure 4:
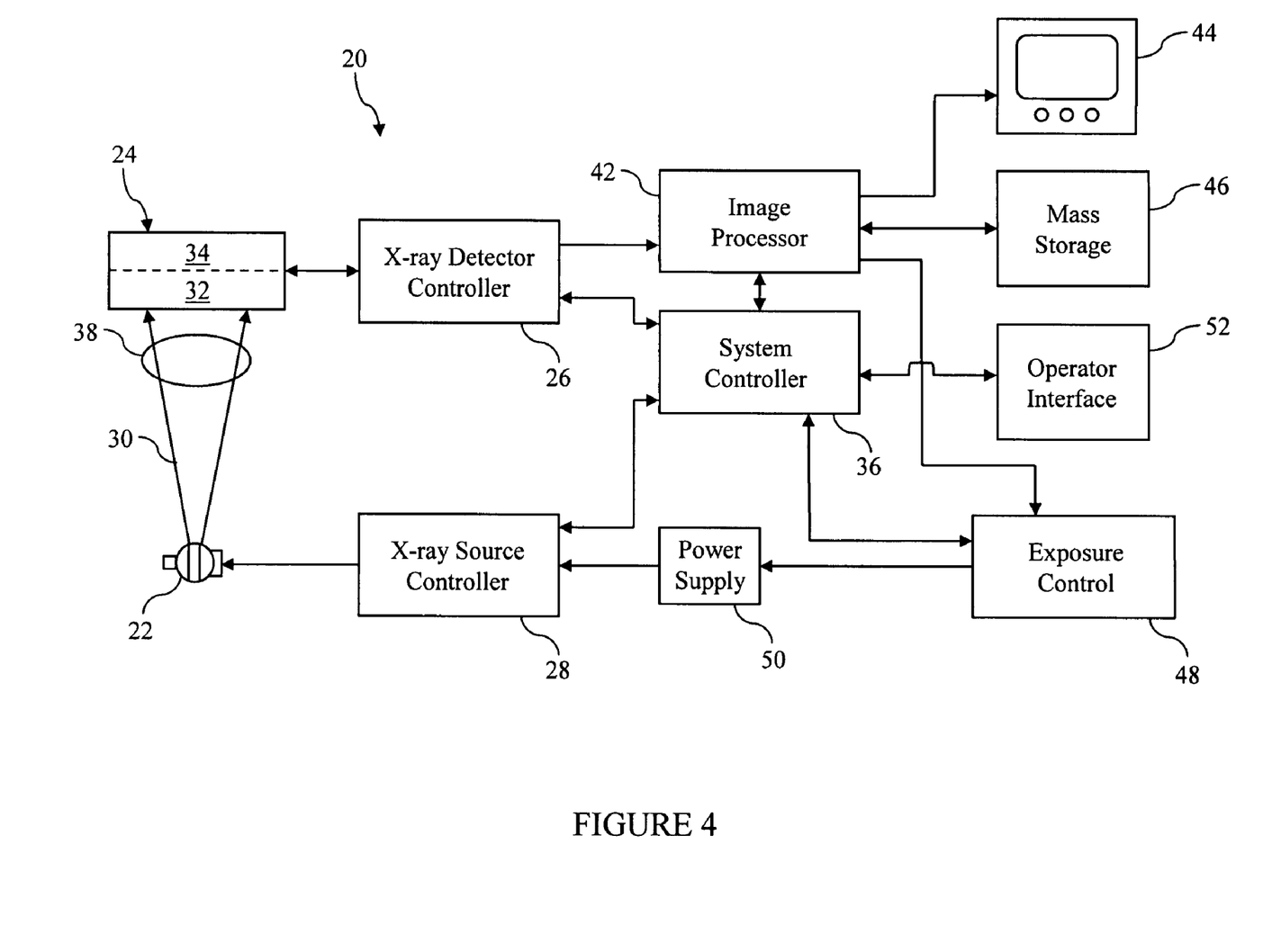
FIG. 4 is a schematic diagram illustrating one exemplary architecture of a digital x-ray imaging system, as used in preferred embodiments of the present invention.

Referring to FIG. 4, a schematic diagram illustrates the architecture of one exemplary digital x-ray imaging system 20, as used in preferred embodiments of the present invention. Such a digital x-ray imaging system 20 typically includes an x-ray source 22, an x-ray detector 24, an x-ray detector controller 26 that contains electronics operable for operating the x-ray detector 24, and an x-ray source controller 28 that contains electronics operable for operating the x-ray source 22. During operation, x-rays 30 are directed from the x-ray source 22 towards the x-ray detector 24, which may include a scintillator 32 and an amorphous silicon array 34. A system controller 36 provides power and timing signals to the x-ray source controller 28 and the x-ray detector controller 26, which then control the operation of the x-ray source 22 and the x-ray detector 24, respectively. After passing through an object to be imaged, such as an anatomical object 38, the x-rays 30 impact the scintillator 32, which converts the x-ray photons to visible light. This visible light is then converted to an electrical charge by an array of photodiodes 40 (FIG. 5) contained in the amorphous silicon array 34. Each photodiode 40 is of large enough area to ensure that it will intercept a substantial portion of the visible light produced by the scintillator 32. Each photodiode 40 also has a relatively large capacitance that allows it to store the electrical charge that results from the photon excitation. A data acquisition system within the x-ray detector controller 26 samples analog electrical charge data from the x-ray detector 24 and converts that analog electrical charge data to digital signals for subsequent processing. The digital signals are sent to an image processor 42, where the image is processed and enhanced. The processed, enhanced image may then be displayed on a cathode ray tube display 44 or other suitable display, and/or the image may be stored in mass storage 46 for later retrieval. The image processor 42 may also produce a brightness or intensity control signal that is applied to an exposure control circuit 48 to regulate the power supply 50, thereby regulating the x-ray source 22 through x-ray source controller 28. The overall operation of the digital x-ray imaging system 20 is governed by the system controller 36, which receives commands and/or scanning parameters from an operator via an operator interface 52. The operator interface 52 includes a keyboard, touchpad, or other suitable input device. The associated cathode ray tube display 44 or other suitable display allows the operator to view the reconstructed image and other data generated by the image processor 42. The operator-supplied commands and/or scanning parameters are used by the system controller 36 to provide control signals and other information to the image processor 42, the x-ray detector controller 26, the x-ray source controller 28, and/or the exposure control circuit 48.

Various embodiments of the present invention make use of software or firmware running on the system controller 36 to carry out the processing of data and/or images. A mouse, pointing device, or other suitable input device is employed to facilitate the entry of data and/or image locations. Various embodiments of the present invention make use of a general purpose computer or workstation having a memory and/or printing capability to store and/or print images. Suitable memories are well known to those of ordinary skill in the art and may include, but are not limited to, random-access memory, one or more hard drives, diskettes, optical media, etc. Embodiments using a general purpose computer or workstation may send/receive data via conventional electronic storage media and/or a conventional communications link, and images may be reconstructed there from.

Figure 5:
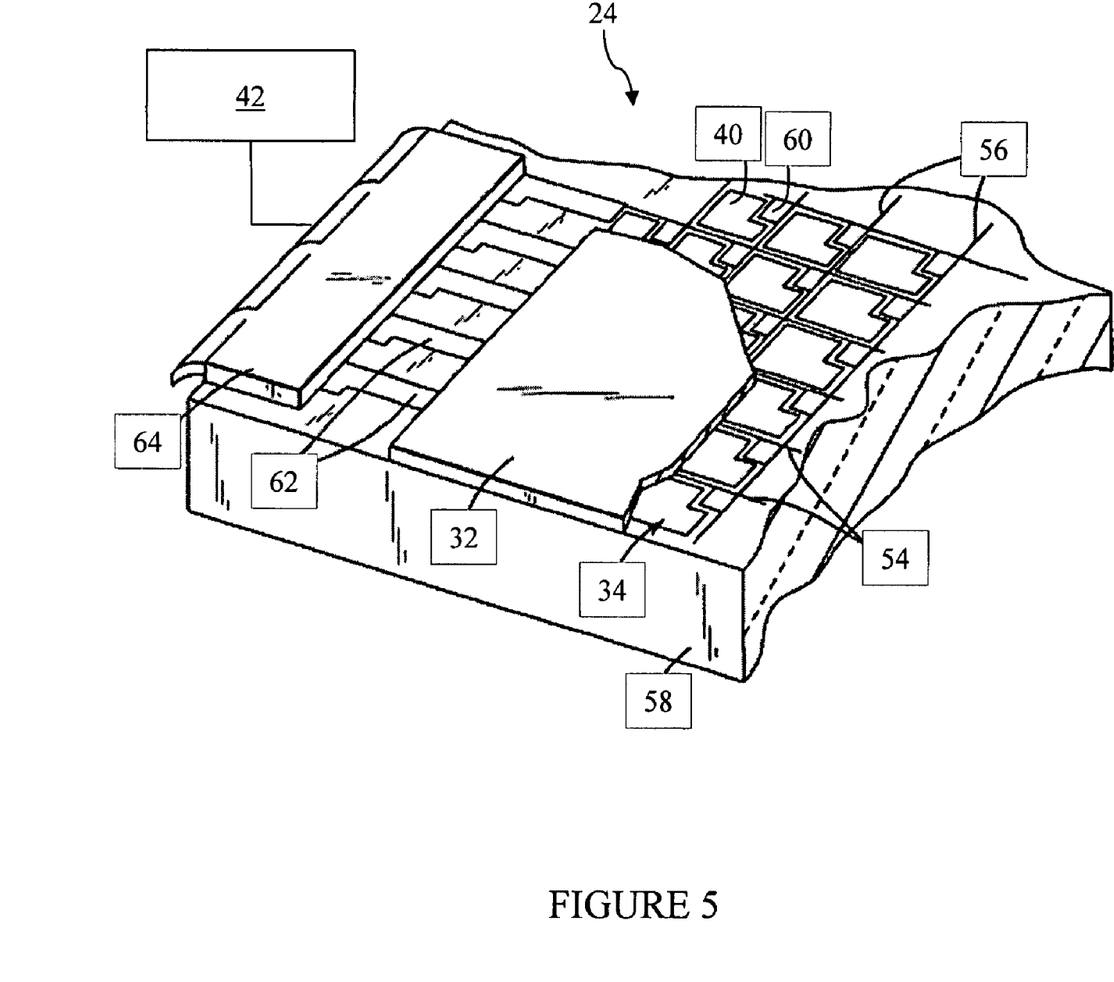
FIG. 5 is a perspective view illustrating one exemplary amorphous silicon flat-panel x-ray detector, as used in preferred embodiments of the present invention.

Referring to FIG. 5, a perspective view illustrates one exemplary amorphous silicon flat-panel x-ray detector 24, as used in preferred embodiments of the present invention. Typically, column electrodes 54 and row electrodes 56 are disposed on a single-piece glass substrate 58, and an amorphous silicon array 34 is defined thereby. The amorphous silicon array 34 includes an array of photodiodes 40 and field-effect transistors 60. A scintillator 32 is disposed over the amorphous silicon array 34 and is optically coupled thereto. The scintillator 32, which may be a dose-efficient cesium iodide scintillator or the like, receives and absorbs x-ray radiation during operation and converts the x-ray photons therein to visible light. The high-fill factor amorphous silicon array 34, each photodiode 40 therein representing a pixel, converts the detected visible light into an electrical charge. The charge at each pixel is read and digitized by low-noise electronics, via contact fingers 62 and contact leads 64, and thereafter sent to an image processor 42.

As described above, when sub-images are acquired using auto-exposure techniques and processed individually, the auto-exposure techniques ensure that anatomical thickness differences are compensated for and accurately represented. The combined image will then have a sufficiently narrow dynamic range to be displayed as is. Referring again to FIGS. 1 and 2, however, the combined image 10 will include different brightness or intensity bands, the boundaries of which correspond to the boundaries of the sub-images 12. These low-frequency band artifacts 14 are caused by the fact that the brightness or intensity levels of each of the sub-images 12 are matched only where they are measured, namely in the center portion 16 of each of the sub-images 12. The low-frequency band artifacts 14 are bothersome to those analyzing the combined image 10, especially in the junction regions, and may obscure anatomical detail.

As described above, when sub-images are acquired using similar fixed techniques, or if the sub-images are normalized with regard to exposure, the different brightness or intensity bands are not visible. Referring again to FIG. 3, however, the dynamic range of the combined image 10 is increased and some portions 18 of the combined image 10 become saturated, such that only portions of the combined image 10 may be used diagnostically. Conventional dynamic range management algorithms may be able to compensate for this effect, but extreme parameters must be used, leading to potentially strong distortions in the area of interest, as the intent of such algorithms is to compensate for effects in an area not wider than the physical detector. Again, a non-diagnostic image results.

Figure 6:
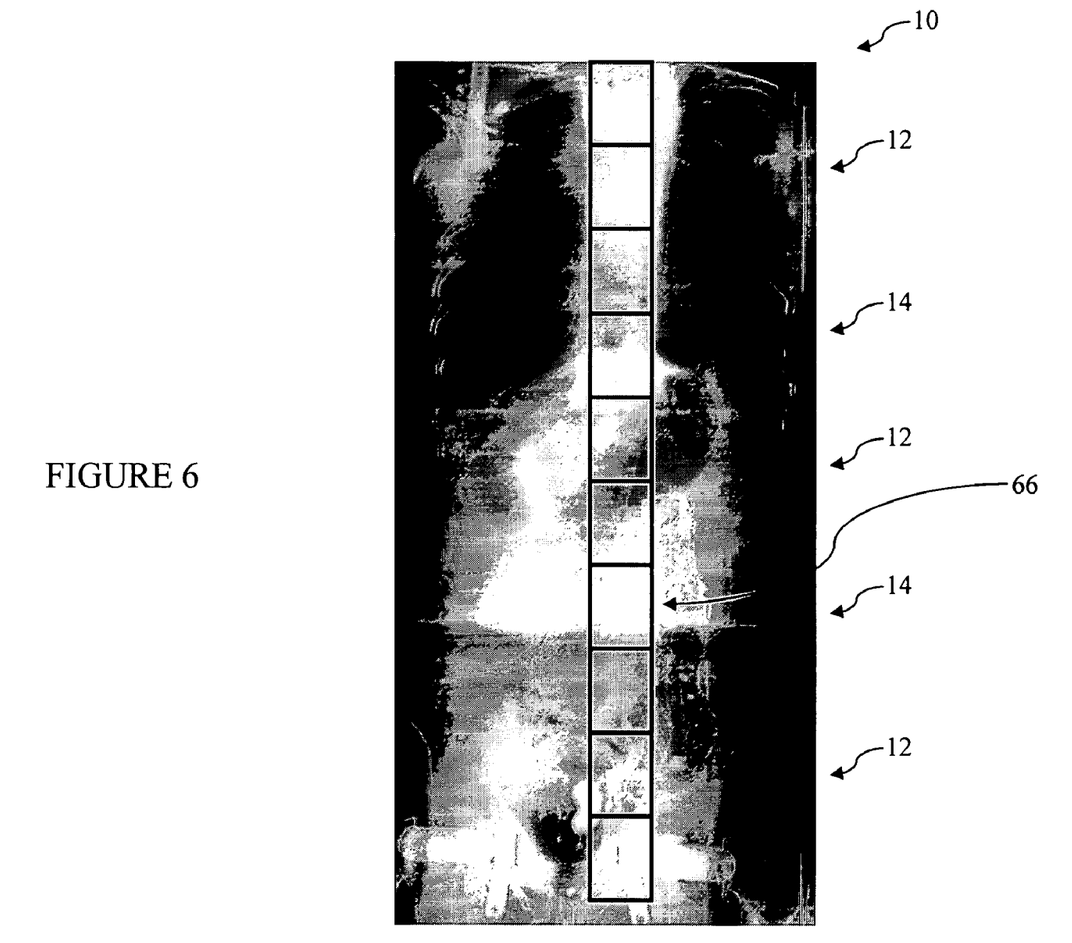
FIG. 6 is a digital medical image illustrating the locations of a plurality of virtual ion chambers associated with a combined image used in conjunction with the medical imaging method of the present invention.

Referring to FIG. 6, in general, the present invention uses a plurality of virtual ion chambers 66 in conjunction with the pasting of a plurality of sub-images 12 to form a single, larger combined image 10. These virtual ion chambers 66 allow for the matching of the brightnesses or intensities in adjacent regions of each of the sub-images 12 and the combined image 10, thus avoiding the low-frequency band artifacts 14 described above. The resulting combined image 10 is equivalent to an image that would be acquired using a slot-scanning device, however, it does not require the use of any specific medical imaging system.

Figure 7:
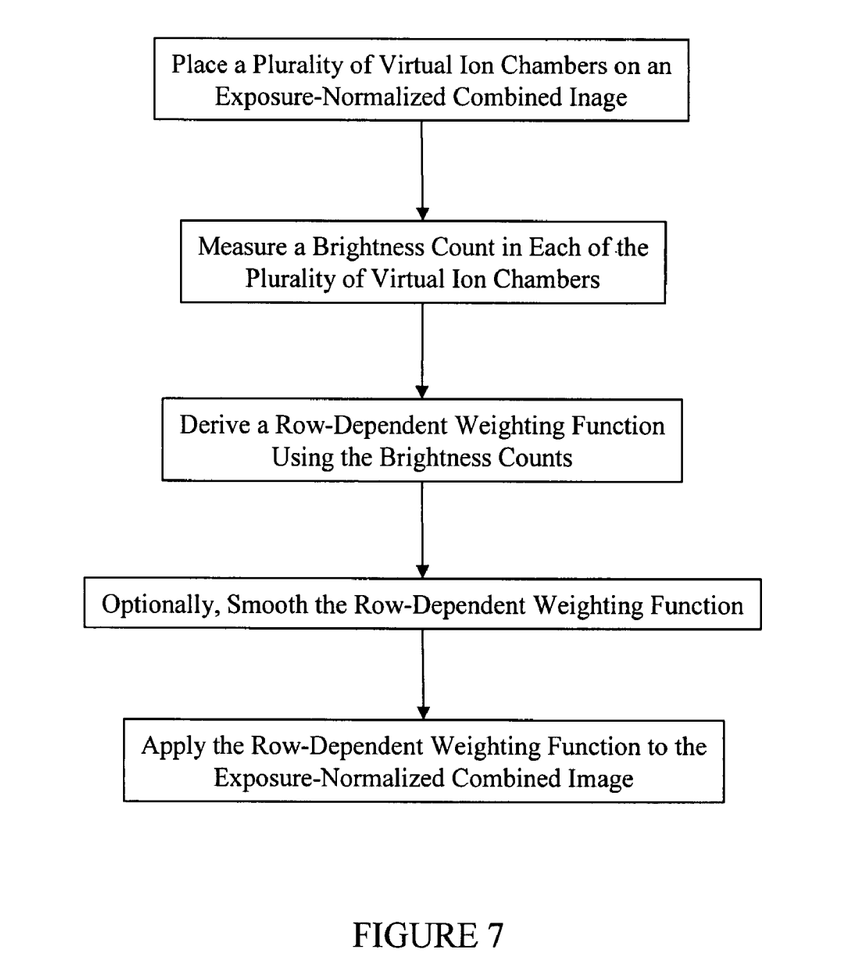
FIG. 7 is a flow chart illustrating the medical imaging method of the present invention.
Figure 8:
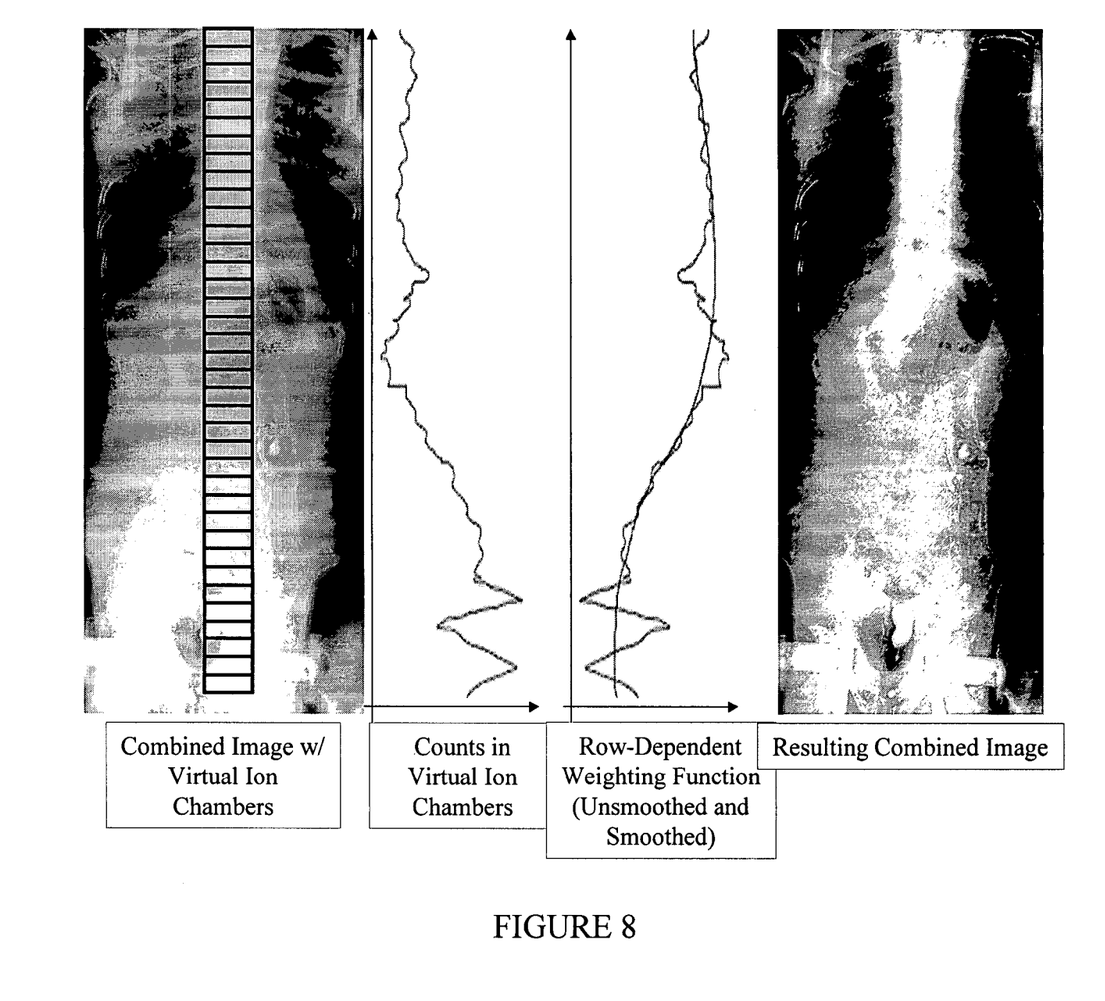
FIG. 8 is two digital medical images and two plots illustrating the medical imaging method of the present invention, the two plots illustrating brightness or intensity-related counts in the plurality of virtual ion chambers of FIG. 7 and both unsmoothed and smoothed row-dependent weighting functions derived from these brightness or intensity-related counts, respectively.

The method of the present invention uses an exposure-normalized combined image 10 wherein each sub-image 12 is normalized by its exposure, thus producing a combined image 10 without low-frequency band artifacts 14, but having a wide dynamic range. It is then possible to equalize the brightness or intensity of this exposure-normalized combined image 10 with great flexibility by placing a plurality of virtual ion chambers 66 in predetermined locations, measuring the corresponding count in each of the plurality of virtual ion chambers 66, and then modifying the gray-level of the pixels accordingly in each of the plurality of corresponding regions. Preferably, the plurality of virtual ion chambers 66 are aligned in the scanning direction, as this is the direction in which the most brightness or intensity equalization is needed. The plurality of virtual ion chambers 66 may or may not be placed directly adjacent to one another. Based upon the count measured in each of the plurality of virtual ion chambers 66, a row-dependent weighting function is derived and applied to the combined image 10. Preferably, the weighting function is smoothed prior to being applied. This method is illustrated in FIGS. 7 and 8.

The method of the present invention may also be applied to non-rectilinear acquisition geometries, where the plurality of virtual ion chambers 66 would be placed on a two-dimensional grid and a two-dimensional weighting function would be used. Three-dimensional digital medical image processing is also contemplated. A coefficient may also be introduced in order to change the gain of the weighting function, thus controlling the amount of equalization that is applied to the combined image 10.

Although the present invention has been illustrated and described with reference to preferred embodiments and specific examples thereof, it should be noted that other embodiments and examples may perform the same functions and/or achieve similar results. All such equivalent embodiments and examples are within the scope and spirit of the present invention and are intended to be covered by the following claims.

What is claimed is:

1. A method for processing a digital image, comprising:
   acquiring a plurality of sub-images;
   pasting the plurality of sub-images together to form a single larger combined image;
   defining a plurality of regions within the single larger combined image;
   measuring an intensity for each of the plurality of regions within the single larger combined image;
   deriving an intensity weighting function using the intensity measured for each of the plurality of regions within the single larger combined image; and
   applying the intensity weighting function to the single larger combined image.

2. The method of claim 1, wherein the plurality of sub-images comprises a plurality of acquisition-normalized sub-images.

3. The method of claim 1, wherein the plurality of regions within the single larger combined image are directly adjacent to one another.

4. The method of claim 1, wherein the plurality of regions within the single larger combined image comprise a plurality of virtual ion chambers associated with the single larger combined image.

5. The method of claim 1, wherein the intensity weighting function comprises an intensity weighting function selected from the group consisting of a row-dependent intensity weighting function, a column-dependent intensity weighting function, a row and column-dependent intensity weighting function, a two-dimensional intensity weighting function, and a three-dimensional intensity weighting function.

6. The method of claim 1, further comprising smoothing the intensity weighting function prior to applying it to the single larger combined image.

7. The method of claim 1, wherein the plurality of sub-images and the single larger combined image each comprise a digital x-ray images.

8. A method for processing a digital medical image, comprising:
   defining a plurality of regions within a combined digital medical image, wherein the combined digital medical image is formed from digital pasting or stitching of a plurality of individual digital medical images, and wherein the combined digital medical image comprises an acquisition-normalized combined digital medical image;
   measuring an intensity for a plurality of regions within the combined digital medical image;
   deriving an intensity weighting function using the intensity measured for each of the plurality of regions within the combined digital medical image; and
   applying the intensity weighting function to the combined digital medical image.

9. The method of claim 8, wherein the plurality of regions within the combined digital medical image are directly adjacent to one another.

10. The method of claim 8, wherein the plurality of regions within the combined digital medical image comprise a plurality of virtual ion chambers associated with the combined digital medical image.

11. The method of claim 8, wherein the intensity weighting function comprises an intensity weighting function selected from the group consisting of a row-dependent intensity weighting function, a column-dependent intensity weighting function, a row and column-dependent intensity weighting function, a two-dimensional intensity weighting function, and a three-dimensional intensity weighting function.

12. The method of claim 8, further comprising smoothing the intensity weighting function prior to applying it to the combined digital medical image.

13. The method of claim 8, wherein the plurality of individual digital medical images and the combined digital medical image each comprise a digital x-ray images.

* * * * *